United States Patent
Vincent

(10) Patent No.: US 8,009,854 B2
(45) Date of Patent: Aug. 30, 2011

(54) SYSTEM FOR THE PROJECTION OF CINEMATOGRAPHIC WORKS AND DIGITAL WORKS WITH SOUND

(75) Inventor: Pierre Vincent, Ecquevilly (FR)

(73) Assignees: Pierre Vincent, Ecquevilly (FR), part interest; Maxmilien Brabec, Larmor Baden (FR)

( * ) Notice: Subject to any disclaimer, the term of this patent is extended or adjusted under 35 U.S.C. 154(b) by 746 days.

(21) Appl. No.: 10/552,866

(22) PCT Filed: Apr. 9, 2004

(86) PCT No.: PCT/FR2004/050154
§ 371 (c)(1),
(2), (4) Date: Feb. 6, 2006

(87) PCT Pub. No.: WO2004/093492
PCT Pub. Date: Oct. 28, 2004

(65) Prior Publication Data
US 2006/0256985 A1 Nov. 16, 2006

(30) Foreign Application Priority Data
Apr. 11, 2003 (FR) .................................... 03 04562

(51) Int. Cl.
*H04R 25/00* (2006.01)
(52) U.S. Cl. .................. 381/388; 381/333; 381/152
(58) Field of Classification Search .................. 381/306, 381/307, 300, 388, 333, 152, 431, 308; 352/11
See application file for complete search history.

(56) References Cited

U.S. PATENT DOCUMENTS

| | | | | |
|---|---|---|---|---|
| 2,013,695 A * | 9/1935 | McLean | 381/354 |
| 2,175,434 A * | 10/1939 | Hurley | 359/444 |
| 3,553,392 A * | 1/1971 | Liebscher et al. | 381/152 |
| 4,998,283 A * | 3/1991 | Nishida et al. | 381/388 |
| 5,004,067 A * | 4/1991 | Patronis | 181/188 |
| 5,007,707 A * | 4/1991 | Bertagni | 359/444 |
| 5,025,474 A * | 6/1991 | Tanaka et al. | 381/333 |
| 5,109,423 A * | 4/1992 | Jacobson et al. | 381/336 |
| 5,400,414 A * | 3/1995 | Thiele | 381/190 |
| 5,993,006 A | 11/1999 | Takeuchi et al. | |
| 6,332,029 B1 * | 12/2001 | Azima et al. | 381/152 |
| 6,389,935 B1 * | 5/2002 | Azima et al. | 81/388 |
| 6,522,760 B2 * | 2/2003 | Azima et al. | 381/152 |
| 6,731,764 B2 * | 5/2004 | Asada et al. | 381/152 |
| 2002/0118847 A1 | 8/2002 | Kam | |

OTHER PUBLICATIONS

Dolby Labs, "Technical Guidelines for Dolby Stereo Theatres", Nov. 1994, Rev. 1.33, pp. 37-38.*

* cited by examiner

*Primary Examiner* — Curtis Kuntz
*Assistant Examiner* — Ryan Robinson
(74) *Attorney, Agent, or Firm* — Bachman & LaPointe, P.C.

(57) ABSTRACT

A system for the projection of cinematographic works or digital works with sound having at least one sound channel. The system comprises a screen and, for the sound channel, at least one woofer and at least one medium/treble transducer. The screen is a non-perforated screen. The medium/treble speaker is a flat sound transducer placed against the screen to the rear thereof in relation to the direction of projection. An extreme treble speaker is disposed on the periphery of the screen.

11 Claims, 3 Drawing Sheets

SYSTEM FOR THE PROJECTION OF CINEMATOGRAPHIC WORKS AND DIGITAL WORKS WITH SOUND

BACKGROUND OF THE INVENTION (1) Field of the Invention

This invention relates to a system for the projection of cinematographic works or digital works with sound, and more specifically for such films with at least one sound channel, the said system comprising a screen and, for the said sound channel, at least one woofer and at least one medium/treble speaker. Hereinafter, sound channel will refer only to the screen channels, not including the environment channels which, in the invention, are treated in the conventional manner.

(2) Prior Art

There are normally three screen channels: a left channel, a central channel and a right channel. There are also systems with five channels including a middle-left channel and a middle-right channel.

Finally, there are giant-screen systems with four channels, two of which are lateral channels and the other two are a central-high channel and a central-low channel.

In conventional systems, each channel comprises two or three speakers, namely, in every case, a woofer and either a medium/treble speaker or one mid-range speaker and one tweeter. The medium/treble speaker, mid-range speaker and tweeter are generally horn speakers. These speakers are placed behind the screen.

Due to this layout, it becomes necessary to use perforated screens, made from a sheet of PVC provided with perforations or microperforations. In fact, although a non-perforated screen allows the bass through with no difficulties, it causes an unacceptable attenuation of the mediums, trebles and extreme trebles.

Perforated screens however, have a certain number of disadvantages in terms of sound and also degrade the quality of the image. In terms of the sound, the perforated screen introduces a mask effect as well as interference due to the dispersion of the sound waves passing through the perforations. In terms of the image, the perforations considerably reduce the brightness, contrast and definition. In addition, in the first rows of the projection room, the perforations are visible as a weft.

Document U.S. Pat. No. 5,025,474 already suggests using a projection screen as an acoustic diaphragm directly activated by magnetic actuators. However, such an arrangement is only possible for smaller-sized screens. In addition, the mediums and trebles cannot be suitably reproduced using this system.

Documents U.S. Pat. No. 5,004,067 and U.S. Pat. No. 5,109,423 also suggest using a non-perforated screen and placing medium/treble horn speakers above the screen. This arrangement has the serious drawback of shifting the sound image completely upwards, out of the screen for the most part.

SUMMARY OF THE INVENTION

This invention aims to compensate for these disadvantages.

More specifically, the invention has the aim of providing a projection system that has the image quality of a non-perforated screen while ensuring a clear improvement of the sound quality as well as excellent compliance with current regulations (specifically the ISO 2969 "X" curve standard) and with the mixing desired by the producer on the artistic level.

For this purpose, the invention provides a system for the projection of cinematographic works or digital works with sound with at least one sound channel, comprising a screen and, for the said sound channel, at least one woofer and at least one medium/treble speaker, in which:

the screen is a non-perforated screen;

the medium/treble speaker is a flat sound transducer placed against the screen to the rear thereof in relation to the direction of projection;

an extreme treble speaker is disposed on the periphery of the screen.

Indeed, we have been able to observe that, provided one or several flat transducers are used for the mediums and trebles and they are placed against the screen, the vibrations of this frequency range, which are conveniently transmitted passively by the screen, make it possible to adapt the acoustic impedance in front of the screen.

Only the extreme trebles are not conveniently transmitted by the screen (problems with directivity and spatialisation of sounds in the room), so speakers placed on the periphery of the screen are used for this range of frequencies. This does not cause any inconvenience, since the human ear is not very sensitive to the location of extreme treble sources.

In a specific embodiment of the invention, the said medium/treble transducer is disposed substantially above the woofer.

Also in a specific embodiment of the invention, the extreme treble speaker is disposed above the screen, substantially above the medium/treble transducer.

In the case of a system intended for the projection of cinematographic films with multi-channel sound comprising at least two lateral channels, the extreme treble speakers of the said lateral channels can be disposed on either side of the screen.

More specifically, the extreme treble speakers of the said lateral channels can be disposed substantially at the height of the medium/treble transducers of the corresponding channels.

In another embodiment of the invention, the extreme treble speakers of the said lateral channels are disposed above the screen.

More specifically, these extreme treble speakers of the said lateral channels can be disposed substantially above the medium/treble transducers of the corresponding channels.

In the case of a system intended for the projection of cinematographic films with four channels comprising two lateral channels, one central-high channel and one central-low channel, the extreme treble speaker of the said central-high channel can be disposed above the screen and the extreme treble speaker of the said central-low channel can be disposed under the screen.

The aforementioned woofers can be arranged such as to produce sounds with a frequency that is lower than around 300 Hz to 800 Hz.

The aforementioned extreme treble speakers can be arranged such as to produce sounds with a frequency that is higher than around 3 kHz to 5 kHz.

BRIEF DESCRIPTION OF THE DRAWINGS

Next, as a non-exhaustive example, we will describe specific embodiments of the invention in reference to the appended diagrams, in which.

DETAILED DESCRIPTION OF THE PREFERRED EMBODIMENT(S)

Figure 1:
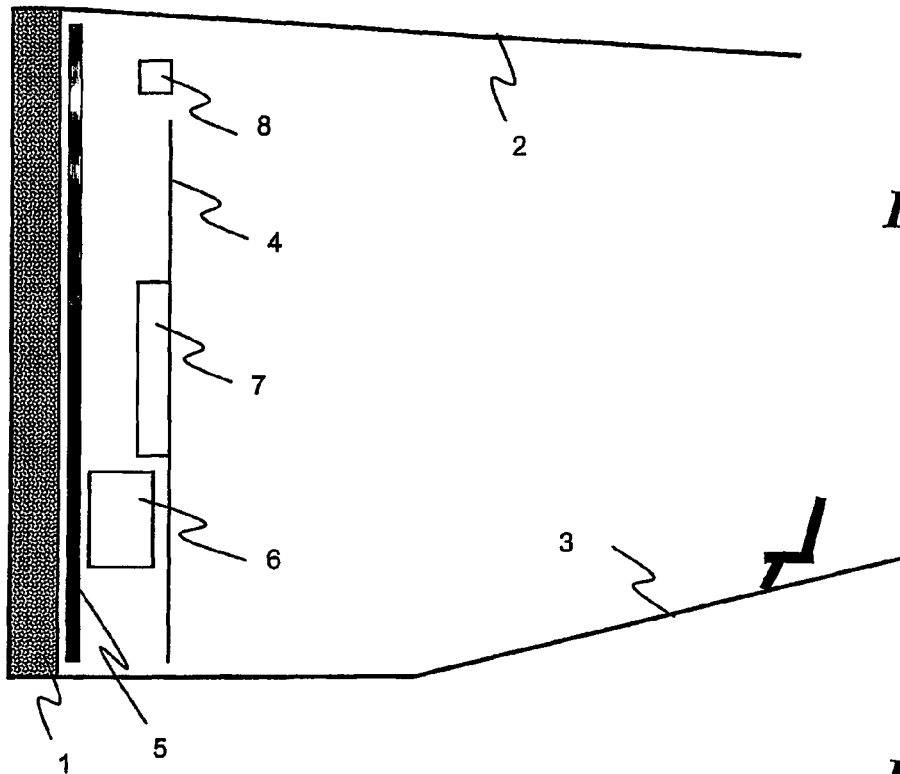
FIG. 1 is a vertical cross-section view perpendicularly to the screen of a cinema projection room equipped with a system according to the invention.

FIG. 1 shows a cinema projection room delimited in the cross-section by a back wall 1 a ceiling 2 and a floor 3.

The screen 4, which is not perforated, is disposed at a certain distance from the back wall 1. A plate 5 of a sound-absorptive material is disposed against the wall 1 on the side of the screen 4 in order to deaden sound reflections, essentially in the bass/medium frequency range.

A woofer 6 is disposed between the screen 4 and the panel 5 towards the bottom of the screen, this speaker being able to produce sounds with a frequency that is lower than around 500 Hz.

A medium/treble speaker 7, which is able to produce sounds in a range of around 500 Hz-4 kHz, is disposed above the woofer 6.

An extreme treble speaker 8 is disposed above the periphery of the screen, above the speakers 6 and 7, this speaker being able to produce sounds with a frequency that is higher than around 4 kHz.

The speaker 7 is a flat sound transducer, the active face of which is placed against the screen 4.

In the above description, the speakers 6 and 8 and the flat transducer 7 belong to the same channel.

Figure 2:
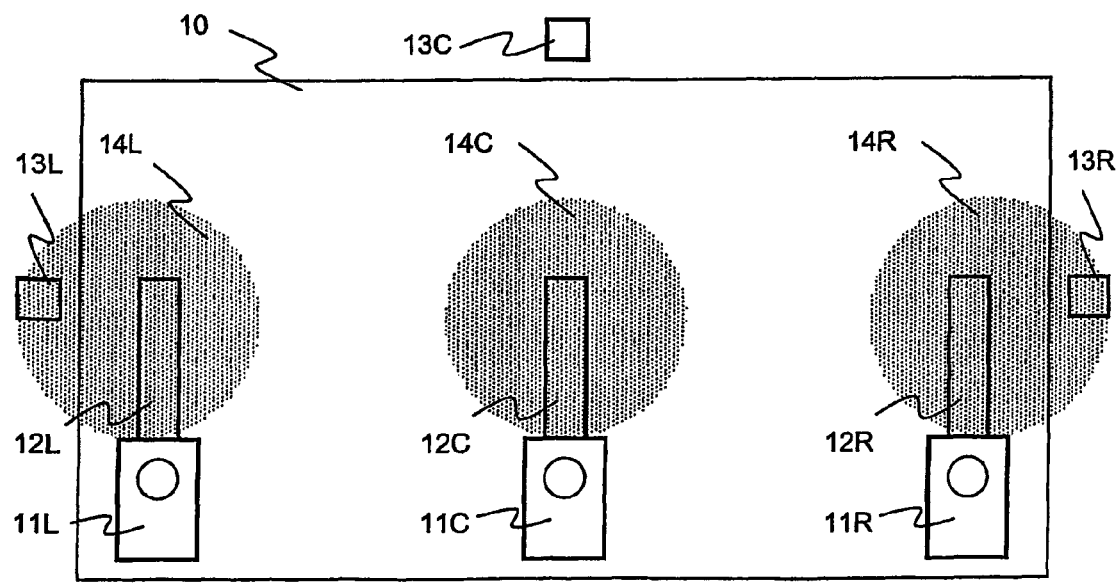
FIG. 2 is a front view of a system according to a first embodiment of the invention.
Figure 3:
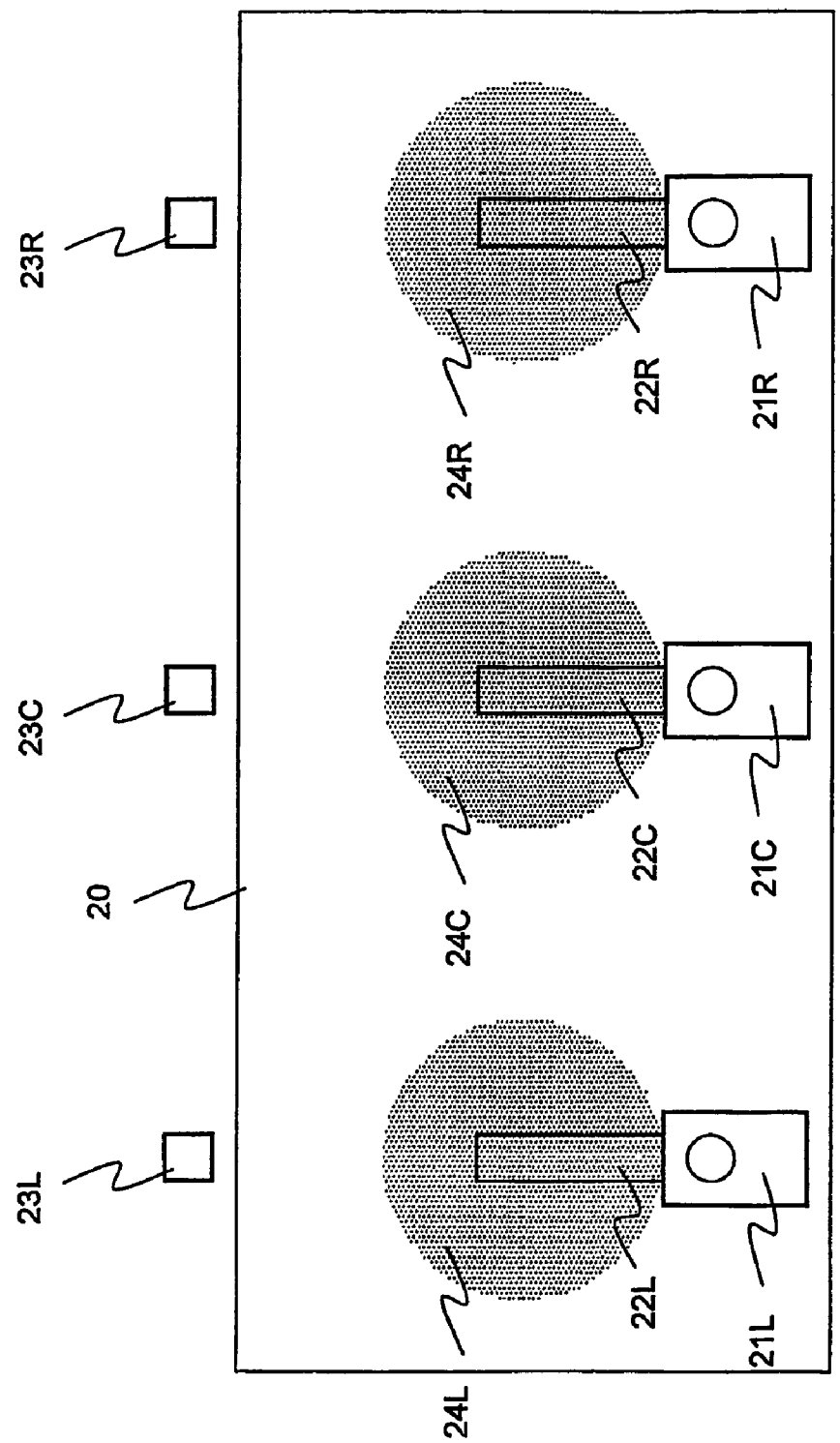
FIG. 3 is a front view of a system according to a second embodiment of the invention.
Figure 4:
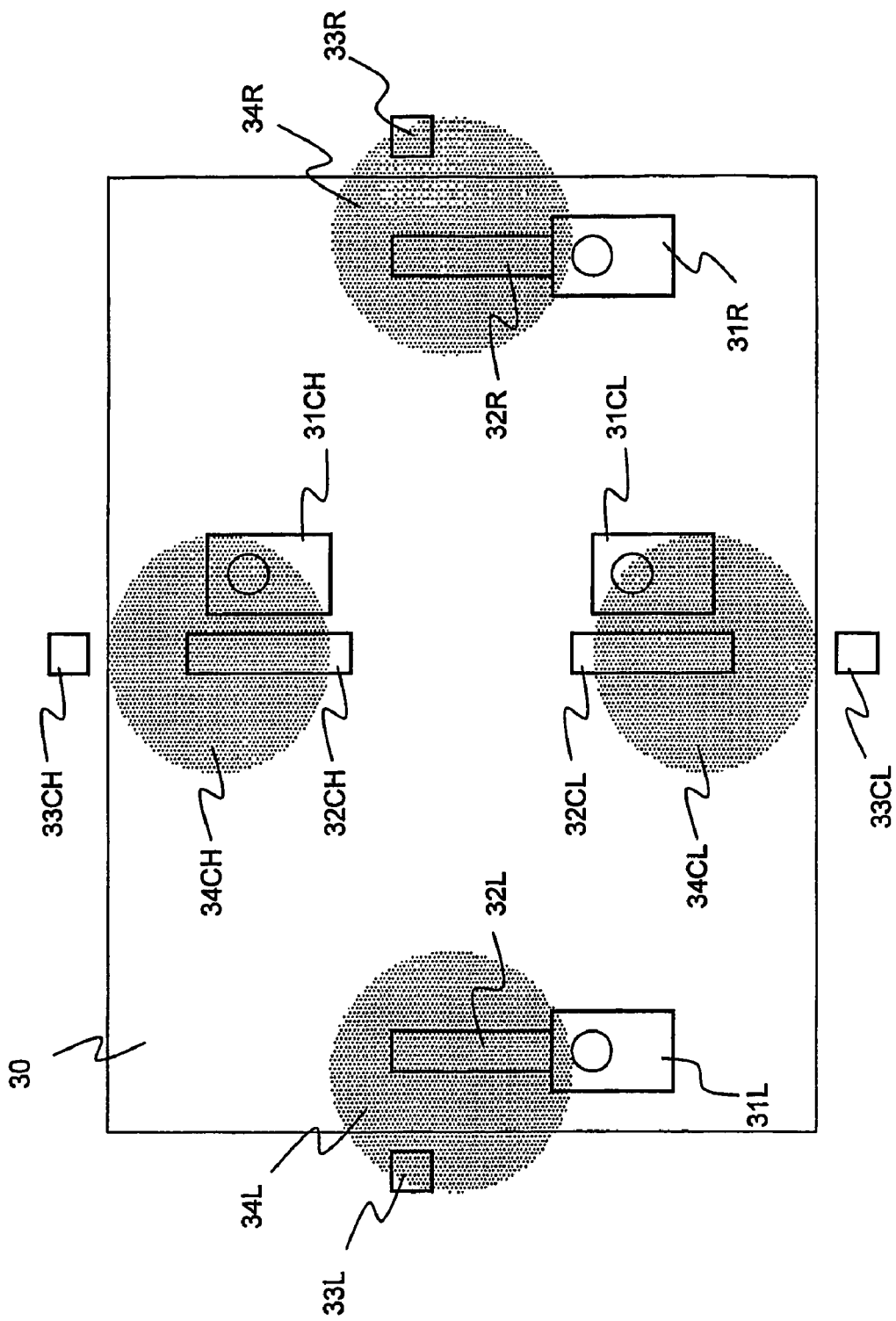
FIG. 4 is a front view of a system according to a third embodiment of the invention.

Next we will describe, in reference to the front views shown in FIGS. 2, 3 and 4, the layout of the speakers parallel to the planes of the screen 4 and the wall 1.

FIG. 2 shows a screen 10 of the so-called "panel" format (also known as a 1.85 panel, with an aspect ratio of 1/1.85).

The left, centre and right channels each comprise a woofer, 11L, 11C and 11R respectively, a medium/treble flat transducer, 12L, 12C and 12R respectively, and an extreme treble speaker, 13L, 13C and 13R respectively.

The central extreme treble speaker 13C is placed above the screen, like the speaker 8 in FIG. 1.

On the other hand, the lateral extreme treble speakers 13L and 13R in this case are each placed on a side of the screen, outside of the screen, substantially at the height of the medium/treble flat transducers, in the example shown substantially at the middle height of the screen 10.

Due to the inevitable overlap of the passbands of the medium/treble transducers and the extreme treble speakers, it can be seen in FIG. 2 that the sound images 14L and 14R of the lateral medium/treble transducers 12L and 12R are shifted slightly outwards from the screen, which allows for an increase of the auditory space. Likewise, the sound image 14C of the central medium/treble transducer 12C is shifted slightly upwards. This last sound image 14C is actually placed at the ideal height, since dialogues are very often placed in this height band.

In FIG. 3, the screen 20 of the type known as "Scope" (also known as Scope 2.39, with an aspect ratio of 1/2.39) is horizontally longer than the panel screen shown in FIG. 2. The woofers and the medium/treble transducers in this figure were given the same references as in FIG. 2, increased by 10. Their layout is substantially the same as in FIG. 2.

On the other hand, if the central extreme treble speaker 23C is disposed like the speaker 13C above the screen substantially in line with the woofer and the medium/treble transducer of the central channel, the lateral extreme treble speakers 23L and 23R are disposed above the screen, above the speakers 21 and 22 of the corresponding lateral channel.

In these conditions, the sound images 24L and 24R of the medium/treble transducers of the lateral channels are shifted slightly upwards in the same way as the sound image 24C of the central channel.

FIG. 4 shows a system with a giant screen 30 and four channels, including a left lateral channel, a right lateral channel and two central channels, high and low. The woofer and the extreme treble speaker as well as the medium/treble transducers of the two lateral channels in this figure were given the same references as in FIG. 2, increased by 20. Their layout is substantially the same as in FIG. 2.

The central-high channel is made up of a woofer 31CH, a flat medium/treble sound transducer 32CH and an extreme treble speaker 33CH. The woofer 31CH and the transducer 32CH are disposed side to side behind the screen, towards the top of the latter. The speaker 33CH is disposed above the screen, substantially above the woofer 31CH and the transducer 32CH.

Likewise, the central-low channel is made up of a woofer 31CL, a flat medium/treble sound transducer 32CL and an extreme treble speaker 33CL. The woofer 31CL and the transducer 32CL are disposed side to side behind the screen, towards the bottom of the latter. The speaker 33CL is disposed under the screen, substantially under the woofer 31CL and the transducer 32CL.

This figure also shows the sound image 34CH of the transducer 32CH, shifted slightly upwards in relation to the latter, and the sound image 34CL of the transducer 32CL, shifted slightly downwards in relation to the latter.

The invention claimed is:

1. A system for the projection of cinematographic works or digital works with sound with at least one sound channel, comprising:
    a cinema projection room;
    a screen within said cinema projection room;
    at least one sound channel comprising at least one woofer for a base side of said at least one sound channel and at least one medium/treble speaker;
    the screen being a non-perforated screen;
    each said woofer being positioned behind said screen;
    the at least one medium/treble speaker comprising a flat sound transducer placed behind said screen in relation to a direction of projection and against the screen;
    said at least one woofer and said at least one sound transducer creating sound coming from the screen itself; and
    an extreme treble speaker placed above said screen and at least one additional treble speaker being disposed on a periphery of the screen.

2. A system according to claim 1 in which the medium/treble transducer is disposed substantially above the at least one woofer.

3. A system according to claim 1, wherein the extreme treble speaker is disposed above the transducer.

4. A system according to claim 1 further comprising at least two lateral channels disposed behind the screen, and a pair of extreme treble speakers for the at least two lateral channels disposed on either side of the screen.

5. A system according to claim 4, further comprising the extreme treble speakers of the at least two lateral channels being disposed substantially at a height of a plurality of flat transducers of corresponding channels.

6. A system according to claim 1 further comprising two lateral channels, and the extreme treble speakers for the lateral channels being disposed above the screen.

7. A system according to claim 6, in which the extreme treble speakers of the lateral channels are disposed substantially above the flat transducers of the corresponding channels.

8. A system according to claim 1 further comprising two lateral channels, a central-high channel and a central-low channel in which an extreme treble speaker of the central-high channel is disposed above the screen, and an extreme treble speaker of the central-low channel is disposed under the screen.

9. A system according to claim 1, further comprising each said woofer being arranged to produce sounds with a frequency that is lower than around 300 Hz to 800 Hz.

10. A system according to claim 1, wherein each said extreme treble speaker is arranged to transmit sounds with a frequency that is greater than about 4 kHz.

11. A system according to claim 1, wherein said cinema projection room is a movie theater.

* * * * *